United States Patent
Harada

(10) Patent No.: US 6,337,295 B1
(45) Date of Patent: Jan. 8, 2002

(54) CERAMIC GRANULE FOR MOLDING CERAMIC PRODUCT, PROCESS FOR PRODUCING OR TREATING THE SAME, CERAMIC MOLDED PRODUCT AND PROCESS FOR PRODUCING THE SAME

(75) Inventor: Hiroshi Harada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/567,505

(22) Filed: May 9, 2000

(30) Foreign Application Priority Data

May 12, 1999 (JP) .......................... 11-131114

(51) Int. Cl.$^7$ .................. C04B 35/00; B29C 67/00; C05B 19/00; C22B 1/14
(52) U.S. Cl. .................. 501/1; 501/103; 501/127; 501/96.1; 501/97.1; 264/117; 23/313 FB
(58) Field of Search .................. 501/1, 103, 126, 501/127, 96.1, 88, 97.1; 264/117; 428/404, 688; 23/313 R, 313 AS, 313 FB

(56) References Cited

U.S. PATENT DOCUMENTS

| | | | | |
|---|---|---|---|---|
| 3,880,968 A | * | 4/1975 | Kaspar et al. | |
| 3,907,956 A | * | 9/1975 | Meunier | |
| 4,057,605 A | * | 11/1977 | Chauvin | |
| 4,143,202 A | * | 3/1979 | Tseng et al. | |
| 4,235,024 A | * | 11/1980 | Chauvin et al. | |
| 4,508,667 A | * | 4/1985 | Elliott | |
| 4,946,654 A | * | 8/1990 | Uhlemann et al. | |
| 4,967,688 A | * | 11/1990 | Funakoshi et al. | |
| 4,992,100 A | * | 2/1991 | Koepff et al. | |
| 5,017,531 A | * | 5/1991 | Ukai et al. | |
| 5,199,986 A | * | 4/1993 | Krockert et al. | |
| 5,268,334 A | * | 12/1993 | Emly et al. | |
| 5,338,709 A | * | 8/1994 | Planes | |
| 5,401,697 A | * | 3/1995 | Guether et al. | |
| 5,472,649 A | * | 12/1995 | Chang et al. | |
| 5,554,391 A | * | 9/1996 | Ohkouchi et al. | |
| 5,593,043 A | * | 1/1997 | Ozmerih | |
| 5,902,761 A | * | 5/1999 | Oda et al. | |

FOREIGN PATENT DOCUMENTS

| JP | 2-217348 | 8/1990 |
|---|---|---|
| JP | 2-279553 | 11/1990 |

\* cited by examiner

Primary Examiner—Tom Dunn
Assistant Examiner—Colleen P. Cooke
(74) Attorney, Agent, or Firm—Sughrue Mion, PLLC

(57) ABSTRACT

A ceramic granule, obtained by granulating at least one ceramic particle into a granule together with a binder, optionally classifying the ceramic granule to remove fine particle having a particle size of not more than 10 μm, moistening the granulated ceramic granule in an agitation fluidized bed under the conditions of not aggregating said ceramic granule and regulating the water content of the moistened ceramic granule by fluidizing and drying the moistened ceramic granule in the agitation fluidized bed in such a manner that the resultant granule has a water content within the range which maintains a flowability sufficient for packing the ceramic granule in a mold in which the ceramic granule exhibits well-balanced properties of a crushing property at a low pressure and an anti-collapse property, excels in flowability, packing property into a mold, and anti-sticking property, and has a well-balanced properties of a crushing property at a low pressure and an anti-collapse property. This ceramic granule can be continuously molded into a ceramic product having a high dimensional accuracy.

8 Claims, 3 Drawing Sheets

COMPARATIVE EXAMPLE 1               EXAMPLE 1

C                                    A

D                                    B

CERAMIC GRANULE FOR MOLDING CERAMIC PRODUCT, PROCESS FOR PRODUCING OR TREATING THE SAME, CERAMIC MOLDED PRODUCT AND PROCESS FOR PRODUCING THE SAME

BACKGROUND OF THE INVENTION

1. Field of the Invention

The present invention relates to a ceramic granule for molding a ceramic product, a process for producing the same or a process for treating the same, a ceramic product obtained therefrom, and a process for producing the ceramic product. More specifically, the present invention relates to a ceramic granule excelling in a molding property, a process for producing or treating the same, a ceramic product having a high dimensional accuracy, and a process for producing the ceramic product.

2. Description of the Related Art

From the viewpoints of a relatively simple manner, a low cost, and the capability of producing a ceramic product on a large scale, a dry pressure molding has been utilized as one process for producing a ceramic product. When a ceramic product is produced by this process, it is general to granulize ceramic particles into ceramic granules for the purpose of easy transportability of the powder, operability in packaging and molding, etc.

As a process for granulating ceramic particles, there are two popular processes: (1) a process (spray drying process) in which an aqueous slurry comprising a ceramic material, a binder, and water is spray-dried by means of a spray dryer to produce a ceramic granule, and (2) a process (oscillating extruding process) in which ceramic particles are granulated into ceramic granules by repeating drying and oscillating extruding have been utilized.

The spray-drying process which can easily control the particle distribution is suitable for producing a large amount of ceramic granules having a relatively small particle diameter. On the other hand, the oscillating extruding process which can be easily operated is suitable for producing relatively compact granules in a small scale plant. The granulation is appropriately selected from these processes depending upon a molded product to be produced, a mold to be used, a production scale, and the like.

In order to produce a ceramic molded product, the ceramic granules are required to possess the following characteristics:

(1) The ceramic granules should have flowability within a suitable range, and a good packing property during the course of packing the ceramic granules into a mold in a uniform manner.

(2) The ceramic granules should be crushed at a low pressure (typically from 0.3 to 1.5 ton/cm$^2$) during the course molding (hereinafter referred to as "a crushing property at a low pressure").

(3) Ingredients such as fine particles contained in the ceramic granule should not be stuck to a mold or the like (hereinafter referred to as "anti-sticking properties").

(4) The ceramic granules are not collapsed during the course of the storage, transportation, agitation when they are packed into a mold, or due to collision with each other (hereinafter referred to as "an anti-collapse property").

(5) The ceramic granules have suitably bulk density so that they flow out of the mold during the course of packing them into a mold, or of molding (hereinafter referred to as "a mold-packing property").

Particularly, the ceramic particles are required to possess conflicting characteristics, i.e., "the crushing property at a low pressure" and "the anti-collapse property".

Various processes have been suggested in order to satisfy these requirements. For example, Japanese unexamined Patent Publication No. 5-159918 and Japanese examined Patent Publication No. 7-17460 disclose processes for improving the flowability and the crushing property at a low pressure utilizing specific dispersants in the preparation of an aqueous slurry.

Japanese examined Patent Publication No. 3-31660 and Japanese unexamined Patent Publication No. 10-59776 disclose processes for improving the flowability and the crushing property at a low pressure of the ceramic granules by decreasing the segregation of the binder.

According to these processes, it is disclosed that ceramic granules having improved flowability, relatively a good mold-packing property, and a crushing property at a low pressure of the ceramic granules can be obtained.

However, these techniques have the following drawbacks:

(1) Since these techniques concern the improvement of aqueous slurry, the granulation process is restricted to the spray-drying process using a spray dryer, leading to poor popularization.

(2) Although the flowability and the crushing property at a low pressure of the ceramic granules are somewhat improved, the something to further improved has been still left. Also, the molded product produced by the use of such ceramic granules has insufficient dimensional accuracy. Further, these ceramic granules are not suitable for producing a ceramic product having a complicated shape.

(3) The ceramic granules are sometimes collapsed during the course of the storage, transportation, or packing them into a mold.

(4) When being molded in a mold, the fine ceramic particles are stuck to the mold, causing sticking, which in some cases makes it impossible to continuously produce ceramic products.

(5) In the ceramic granule granulated by these techniques, due to the storage over a prolonged period of time or distillation of the water, the binder is segregated, cured, or partially converted into fine particles. This changes the properties at the time of the production, such as the flowability, the crushing property at a low pressure of the ceramic granules, or the anti-sticking property.

SUMMARY OF THE INVENTION

Consequently, a first object of the present invention is to provide a ceramic granule excelling in the flowability, the mold-packing property, and the anti-sticking property, and having a well-balanced properties of conflicting properties of the crushing property at a low pressure and the anti-collapse property, and capable of continuously producing a ceramic product.

A second object of the present invention is to provide a process for producing such a ceramic granule in a stable manner.

A third object of the present invention is to provide a process for treating a ceramic granule whose required properties have been deteriorated with the elapse of the time to be activated or an existing ceramic granule to impart such properties.

A fourth object of the present invention is to provide a ceramic product having a high dimensional accuracy.

A fifth object of the present invention is to provide a process for producing a ceramic product having a high dimensional accuracy from a ceramic granule excelling in the flowability, the mold-packing property, and the crushing property at a low pressure, and having a little sticking fine particle to a mold.

As a result of our studies and researches in light of the above circumferences, it has been found that when a ceramic granule is moistened under specific conditions by a specific manner, the above objects can be attained to complete the present invention.

The present invention concerns the following first to fifth aspects:

First Aspect: Ceramic Granule

1. A ceramic granule for producing a ceramic product comprising at least one ceramic particle and a binder, said ceramic granule is moistened under the conditions that the water content of the surface of the ceramic granule is within the range sufficient for maintaining the flowability for packing the ceramic granule into a mold, and the total water content of the ceramic granule is within the range that a crushing property at a low temperature and an anti-collapse property of the ceramic granule are well balanced.

2. A ceramic granule for producing a ceramic product comprising at least one ceramic particle and a binder, the total water content of the ceramic granule ranging from 0.1 to 6.0% by weight, the internal water content of the ceramic granule which occupies ¾ of the total granule ranging from 0.1 to 7.3% by weight, and the external water content of the ceramic granule which occupies ¼ of the total granule ranging from 0 to 2.0% by weight.

3. The ceramic granule as described in (1) or (2) above, wherein the moistening of the ceramic granule is carried out within an agitation fluidized bed.

4. The ceramic granule as described in one of (1) to (3) above, wherein the ceramic granule is granulated by spray drying and the surface of the granule is compact.

5. The ceramic granule as described in one of (1) to (3) above, wherein the ceramic granule is granulated by oscillating extruding process.

6. The ceramic granule as described in one of (1) to (5) above, wherein fine particle having a particle size not more than 10 $\mu$m has been removed by classification.

7. The ceramic granule as described in one of (1) to (6) above, wherein the particle size of the ceramic particles has been regulated.

8. The ceramic granule as described in one of (1) to (7) above, wherein said ceramic granule comprises ferrite particle.

Second Aspect: Process for Producing Ceramic Granule

9. A process for producing a ceramic granule for producing a ceramic product which comprises the following steps:
a step for granulating one or more ceramic particle into a granule together with a binder;
a step for moistening the granulated ceramic in an agitation fluidized bed under the conditions of not aggregating said ceramic granule;
a step for regulating the water content of the moistened ceramic granule by fluidizing and drying the water-added ceramic in the agitation fluidized bed in such a manner that the resultant granule has a water content within the range which maintains a flowability sufficient for packing the ceramic granule in a mold for producing a ceramic product and in which the ceramic granule exhibits well-balanced properties of a crushing property at a low pressure and an anti-collapse property; and
a step for regulating the particle size of the ceramic granule.

10. The process as described in (9) above, which further comprises: a step for carrying out classifying in the agitation fluidized bed by means of a bag filter or air-classification to remove fine particles having a particle size of not more than 10 $\mu$m, after the step for granulating one or more ceramic particle into a granule together with a binder.

11. The process as described in (9) or (10) above, wherein the moistening is carried out so that the total water content of the ceramic granule ranging from 0.1 to 6.0% by weight, the internal water content of the ceramic granule which occupies ¾ of the total granule ranging from 0.1 to 7.3% by weight, and the external water content of the ceramic granule which occupies ¼ of the total granule ranging from 0 to 2.0% by weight.

12. The process as described in any one of (9) to (11) above, wherein the temperature of the agitation fluidized bed is set to the range from 20 to 50° C. by supplying hot air of 50 to 80° C. to the agitation fluidized bed.

13. The process as described in any one of (9) to (12) above, wherein the ceramic granule is granulated by a spray-drying process.

14. The process as described in (13) above, wherein the ceramic granule is granulated in the agitation fluidized bed.

15. The process as described in any one of (9) to (12) above, wherein the ceramic granule is granulated by an oscillating extruding.

Third Aspect: Process for Treating Ceramic Granule

16. A process for treating a ceramic granule, which comprises the following steps:
a step for incorporating a ceramic granule obtained by granulating one or more ceramic particle into a granule together with a binder in an agitation fluidized bed, and moistening the granulated ceramic under the conditions of not aggregating said ceramic granule;
a step for regulating the water content of the moistened ceramic granule by fluidizing and drying the water-added ceramic in the agitation fluidized bed in such a manner that the resultant granule has a water content within the range which maintains a flowability sufficient for packing the ceramic granule in a mold for producing a ceramic product and in which the ceramic granule exhibits well-balanced properties of a crushing property at a low pressure and an anti-collapse property; and
a step for classifying the moistened ceramic granule.

17. The process as described in (16) above, which further comprises: a step for carrying out classifying in the agitation fluidized bed by means of a bag filter or air-classification to remove fine particles having a particle size of not more than 10 $\mu$m, after the step for granulating one or more ceramic particle into a granule together with a binder.

18. The process as described in (16) or (17) above, wherein the moistening is carried out so that the total water content of the ceramic granule ranging from 0.1 to 6.0% by weight, the internal water content of the ceramic granule which occupies ¾ of the total granule ranging from 0.1 to 7.3% by weight, and the external water content of the ceramic granule which occupies ¼ of the total granule ranging from 0 to 2.0% by weight.

19. The process as described in any one of (16) to (18) above, wherein the temperature of the agitation fluidized bed is set to the range from 20 to 50° C. by supplying hot air of 50 to 80° C. to the agitation fluidized bed.

Fourth Aspect: Ceramic Product

20. A ceramic product having a high accuracy obtained by molding the ceramic granule described in anyone of (1) to (8) above into a ceramic product.

Fifth Aspect: Process for Producing Ceramic Product

21. A process for Producing Ceramic Product, which comprises the following steps:
   a step for incorporating a ceramic granule obtained by granulating one or more ceramic particle into a granule together with a binder in an agitation fluidized bed, and moistening the granulated ceramic under the conditions of not aggregating said ceramic granule;
   a step for regulating the water content of the moistened ceramic granule by fluidizing and drying the water-added ceramic in the agitation fluidized bed in such a manner that the resultant granule has a water content within the range which maintains a flowability sufficient for packing the ceramic granule in a mold for producing a ceramic product and in which the ceramic granule exhibits well-balanced properties of a crushing property at a low pressure and an anti-collapse property;
   a step for regulating the particle size of the ceramic granule; and
   a step for molding the resulting ceramic granule into a ceramic product.

22. The process as described in (21) above, which further comprises: a step for carrying out classifying in the agitation fluidized bed by means of a bag filter or air-classification to remove fine particles having a particle size of not more than 10 μm, after the step for granulating one or more ceramic particle into a granule together with a binder.

23. The process as described in (21) or (22) above, wherein the moistening is carried out so that the total water content of the ceramic granule ranging from 0.1 to 6.0% by weight, the internal water content of the ceramic granule which occupies ¾ of the total granule ranging from 0.1 to 7.3% by weight, and the external water content of the ceramic granule which occupies ¼ of the total granule ranging from 0 to 2.0% by weight.

24. The process as described in any one of (21) to (23) above, wherein the temperature of the agitation fluidized bed is set to the range from 20 to 50° C. by supplying hot air of 50 to 80° C. to the agitation fluidized bed.

25. The process as described in any one of (21) to (23) above, wherein the ceramic granule is granulated by a spray drying process.

26. The process as described in anyone of (21) to (23) above, wherein the ceramic granule is granulated by an oscillating extruding.

BRIEF DESCRIPTION OF THE DRAWINGS

FIG. 1A is across-sectional view totally showing the device, and FIG. 1B is a main portion of the agitation fluidized bed of the device.

FIG. 4A is the SEM photograph showing the surface conditions of one ceramic granule according to the present invention, FIG. 4B is the SEM photograph showing the particle distribution of FIG. 4A, FIG. 4C is the SEM photograph showing the surface conditions of one ceramic granule according to the prior art, FIG. 4D is the SEM photograph showing the particle distribution of FIG. 4C

DETAILED DESCRIPTION OF THE INVENTION

Definition

Figure 1:
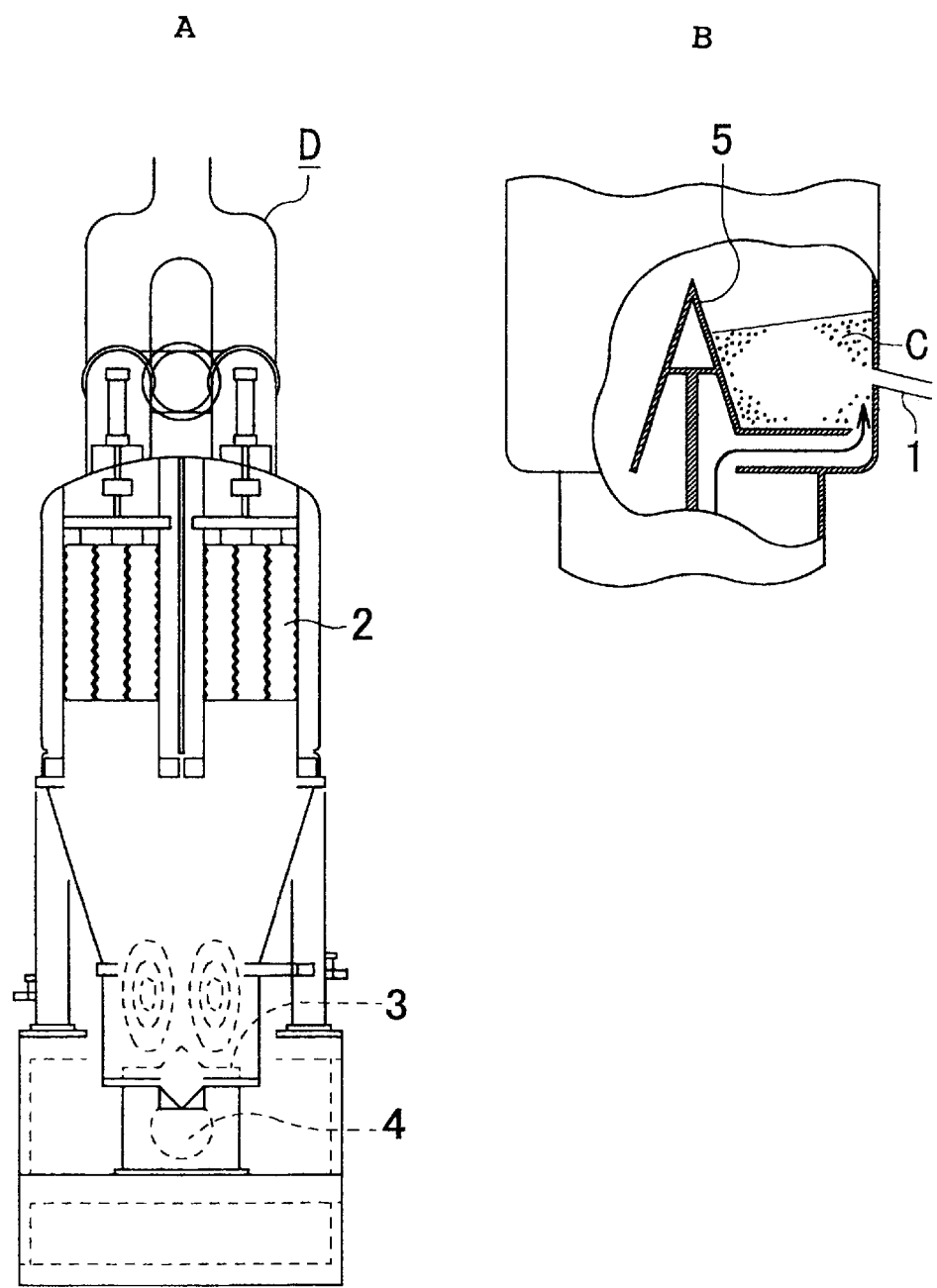
FIG. 1 is a drawing which outlines an example of a device for treating the ceramic according to the present invention; where

The terms used herein have the following meanings:

The terms "the range for maintaining a flowability sufficient for incorporating the ceramic granule in the mold for the ceramic production" used herein is intended to a range in which the ceramic granule to be packed can be uniformly packed in the mold without sticking the granules to the filling means and aggregating the ceramic granules. In general, the surface of the ceramic granule is required to be dried enough for maintaining the flowability.

As for the flowability of the ceramic granule, although it cannot be decided unconditionally because it depends upon the process to be granulated, i.e., shape of the ceramic granule, but in the present invention, a time (second/50 g) required for dropping 50 g of the ceramic granules from a funnel is utilized as a standard for the flowability as defined in JIS Z-2502. The flowability of the ceramic granule produced by a spray drying process is preferably in the range of from 18 to 24 seconds/50 g, and that produced by an oscillating extruding process is preferably from 20 to 34 seconds/50 g.

The term "balanced properties of a crushing property at a low pressure and an anti-collapse property" used herein means that the ceramic granule has properties that it is not collapsed under the conditions of transportation or of storage and that it is well crushed when the ceramic granule according to the present invention is molded at a low pressure in a mold (typically from 0.3 to 1.5 ton/cm$^2$). Generally, the ceramic granule is required to have a prescribed water content.

Description of the Preferred Embodiments

The present invention will now be described in detail by referring to the attached drawings:

Ceramic Granules (Ceramic Powder)

The ceramic granules according to the first aspect of the present invention are mainly composed of ceramic powders and a binder similar to the prior ceramic granules. The ceramic powders used herein are appropriately selected depending upon the application of the ceramic product finally produced and, typical examples include, but are not restricted to, metal oxide ceramics such as ferrite, alumina, and zirconia; non-metal oxide ceramics such as silicon carbide and silicon nitride; composite compounds such as barium titanate salts, and titanate zirconate salts; and the like. These ceramic powders may be used singly or as a mixture of two or more thereof. The resultant ceramic granule may be also composed of a mixture of ceramic granules produced from different ceramic powders. The particle size of the ceramic powder may be within the range which has been conventionally utilized as the raw material of the final ceramic product, and is generally in the range of from 0.5 to 5 $\mu$m, preferably from 0.7 to 3 $\mu$m.

(Binder)

The binder which is used in the present invention at the time of granulation into the ceramic granules may be freely selected from the conventional binders to meet the object. Examples of the binders include, but are not restricted to, partially saponified products of polyvinyl alcohol or poly vinyl acetate, and homopolymers of poly(meth)acrylic acid, methylcellulose, acrylamide, etc. They can be used singly or as a mixture of two or more thereof. The amount of the binder to be added may be the conventional range and is generally from 0.2 to 10 parts by weight, preferably from 0.5 to 5 parts by weight, based on 100 parts by weight of the ceramic powders.

(Optional Components)

Various optional components may be added at the time of the granulation into the ceramic granule of the present invention. Typical examples of the additives are dispersing agents such as polycarboxylates, and condensed naphthalene sulfonic acid; plasticizers such as glycerin, glycols, and triols; lubricants such as waxes, and stearic acid and salts thereof; organic macromolecular aggregating agents such as polyetehr-, urethane modified polyether-, polyacrylic acid-, and modified acrylic acid-macromolecules; inorganic aggregating agents such as aluminum sulfate, aluminum chloride, and aluminum nitrate; and the like.

(Granulation into Ceramic Granules)

In the present invention, various components described above are granulated into the ceramic granules by any of the conventional techniques. The granulation can be carried out by the conventional spray drying or oscillating-extruding. Specifically, the ceramic granule can be prepared by preparing a slurry having the ceramic particles and the binder, and optional additives dispersed in water, and spray drying the resultant slurry by a spray dryer or alternatively, by mixing and granulating the ceramic particles and the binder, and optional additives in a mixing and granulating machine to produce granulated powder, and repeating the extruding granulation and drying. The shape and the particle size of the granule thus produced depend on the granulation process and the objective ceramic products. In the case of the ceramic granule granulated by the spray drying process, the granule has a spherical shape having a particle size generally from 50 to 250 $\mu$m, preferably from 70 to 200 $\mu$m, more preferably from 80 to 150 $\mu$m. The granule granulated by the oscillating extruding generally possesses a particle size of from 80 to 500 $\mu$m, preferably from 100 to 300 $\mu$m, more preferably from 150 to 200 $\mu$m.

It is also within the scope of the present invention that the ceramic granule is produced within a treating device having a fluidized bed which will be described later on by a spray-drying process.

Treatment of Ceramic Granule

Subsequently, the resultant ceramic granule is treated according to the process of the present invention. The treatment of the ceramic granule according to the present invention will now be described in detail by referring to FIG. 1.

FIG. 1 is a drawing showing one example of the device for treating the ceramic granule according to the present invention, where FIG. 1A is a cross-sectional view totally showing the device an FIG. 1B is a cross-sectional view showing the main portion of the agitation fluidized bed of the device. The device D is basically composed of a spraying means 1 for spraying water, means 2 for removing fine particles, and an agitation fluidized bed 3.

(Classification)

Figure 4:
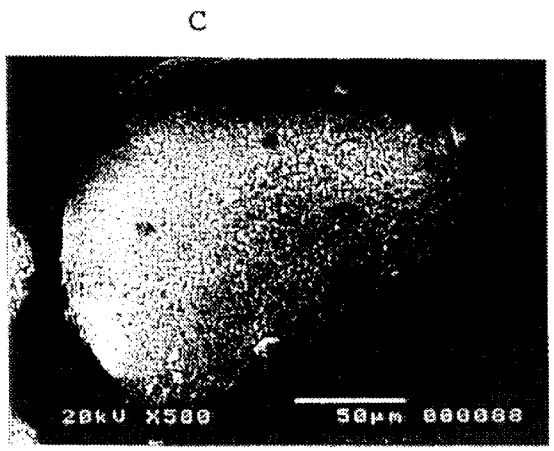
FIG. 4 is a SEM photograph showing the surface conditions of the inventive ceramic granule and comparative ceramic granule produced by the prior art, where
Figure 4:
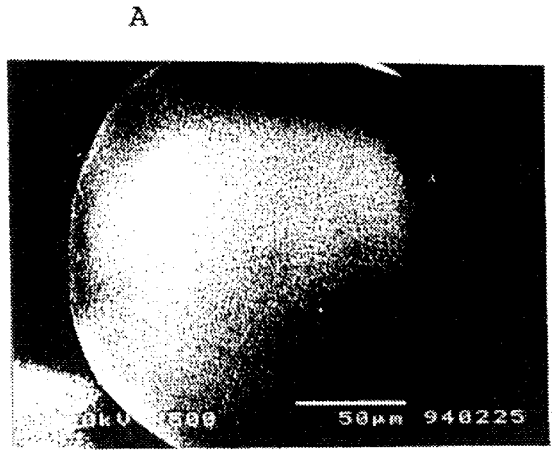
Figure 4:
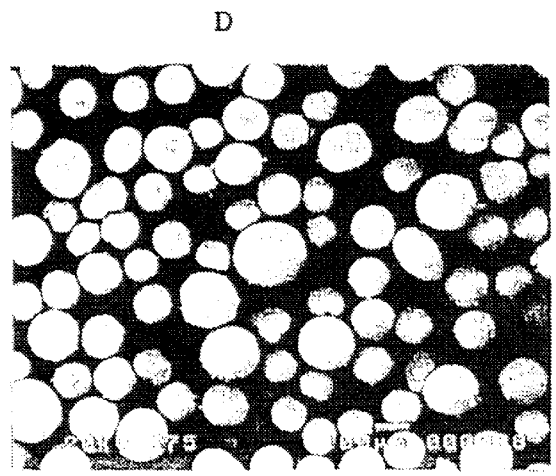
Figure 4:
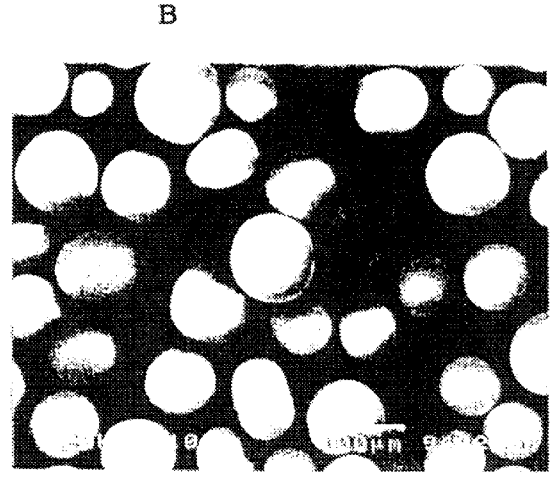

In the present invention, it is preferable that the ceramic granules C incorporated into the device D is classified by the means 2 for removing fine particles in the bed under warm conditions, preferably at a temperature of from 20 to 50° C., while incorporating air from an intake portion 4 and fluidizing the ceramic granules by rotating a rotor 5 to remove the fine particles, for example, having a particle size of not more than 10 $\mu$m. The reason why the classification is carried out in the present invention is that if the ceramic granule having the remaining primary particles, which could not be granulated, adhered onto the surface of the ceramic granule, typically as shown in the comparison of FIG. 4, is incorporated into a mold and then molded, these fine particles are stuck to the mold and remain on the mold to bring about sticking, possibly causing defective molding.

By controlling the intake amount of the air from the intake portion, particles having a small particle size, i.e., light particles move upwardly to be removed by the removing means 2 placed at the upper side of the treating device D (air classification). In this case, a bag filter which is usually installed, or preferably, mesh cloth desirably having an opening of not more than 75 $\mu$m is used as the removing means. In general such a type of treating device D is a device for the purpose of the granulation of ceramic granules by means of agitation-fluidization, and the removing means 2 placed on the upper side collects dust flown upwardly not so as to be exhausted and have a function of returning the dust to the agitation fluidized bed by backwashing. In contrast, the present invention utilizes the removing means 2 as the means for removing the fine particles.

(Impartation of Water)

To the ceramic granules C from which fine particles are removed by the classification, then water is sprayed by means of the spraying means 1, while agitation-fluidizing, to moisten the ceramic granule C. The conditions at this time are such that the ceramic granules in the agitation fluidized bed are not aggregated or granulated with each other and the water sufficiently enters into the interior of the ceramic granule, and that ceramic granules are not broken due to excessive water content or collision with each other. To be specific, depending upon the properties of the ceramic granule itself to be treated (granulation process, particle size, density, etc.), kind of the ceramic contained in the ceramic granule and its particle size, kind of the binder and its content, etc., the conditions are suitably selected.

The temperature within the treating device D is preferably from 20 to 50° C., more preferably from 30 to 40° C. If the temperature is lower than 20° C., the ceramic granules are unduly aggregated or granulated with each other. Conversely, if it exceeds 50° C., the water distills and the ceramic granule is unduly dried before the water enters into the interior of the ceramic granule.

The spray means 1 used in the present invention is not restricted as long as it can be equipped with the treating device to be utilized and can moisten the ceramic granule under the above-mentioned conditions, and preference is given to use a two-fluid nozzle in terms of capability of fine control of the amount to be sprayed, and capability of converting the water into mist.

By moistening the ceramic granule as described above, the components in the ceramic granule is distributed in a uniform manner over the entire of the granule. Furthermore, when the deteriorated ceramic granule, for example, due to a long-term storage, is treated according to the process of the present invention, the conglutinated binder becomes activated, and the binder is uniformly dispersed again by agitation-fluidizing to be optimized. When granules having a large number of gaps obtained by the spray drying is treated according to the process of the present invention, the granules converted into a compact state in the course of the process of the present invention.

(Regulation of Moisture)

By fluidizing and heating the moistened ceramic granules until the water content of the granule surface becomes smaller than that of the interior of the granule and, i.e., the surface of the granule becomes compact due to the collision of the granule with each other. With regard to the temperature within the bed in this case, from the same reasons as those of the water impartation described above, the temperature of hot air introduced into the bed is preferably from 50 to 80° C., more preferably from 65 to 75° C. When the ceramic is dried, it is general to blow hot air to the ceramic granule. The period of drying the ceramic granule is suitably selected depending upon the equipment to be utilized, conditions for moistening the ceramic granule, and surrounding environments, and for example, in a device having a capacity of 20 kg, it is from 30 seconds to 10 minutes, preferably from 1 to 3 minutes.

The drying is carried out until the ceramic granule thus treated becomes the condition where the interior thereof is wet and the surface thereof is dried.

It is very difficult to specify the water distribution in the ceramic granule. However, in the present invention, for example, the ceramic granule is crushed by a crusher, and water content of the surface portion (¼ as weight fraction) of the ceramic granule and that of the internal portion (¾ as weight fraction) of the ceramic granule are separated and then measured. In general, the total water content of the ceramic granule is from 0.1 to 6.0% by weight, preferably from 0.3 to 4.5% by weight, the internal water content of the ceramic granule which occupies ¾ of the total granule is from 0.1 to 7.3% by weight, preferably from 0.4 to 6.0% by weight, and the external water content of the ceramic granule which occupies ¼ of the total granule is from 0 to 2.0% by weight, preferably 0% by weight (substantially dried). If the total water content or the internal water content of the ceramic granule is lower than the lower limit, there is a possibility to causing a crack when the ceramic granule is molded, and the crush property at a low pressure is changed for the worse. Also, in the case of the granule obtained from a spray drying process, the bulk density of the granule becomes small, leading to poor mold-packing property. Conversely, if the total water content or the internal water content of the ceramic granule is higher than the above range, a large amount of the fine particles are stuck to the mold (decrease in the anti-sticking property), and the aggregation or adhering of the granules with each other are brought about causing to a decrease in the dimensional accuracy. It is preferred that the water content of the surface of the ceramic granule is as small as possible. If it exceeds 2% by weight, the flowability of the ceramic granule is poor and the anti-collapse property is decreased.

(Regulation of Particle Size of Ceramic Granule)

In order to make the particle size of the ceramic granule according to the present invention thus treated uniform, it is preferable to regulate the size of the ceramic granules by means of regulating the size of the granules such as a shifter.

In the embodiments described above, the ceramic granules previously granulated has been described, the ceramic granule may be granulated, for example, in the device of FIG. 1, and then treated according to the present invention.

Consequently, the present invention is intended to encompass a process for producing ceramic granules having a specific water distribution and a process for treating ceramic granule to have a specific water distribution.

The resulting ceramic granule may be stored under the conditions where the water distribution according to the present invention may be maintained (f or example in a sealed container).

(Characteristics of Granule)

The ceramic granules according to the present invention obtained as described above has good flowability, since the surface is well dried and is made into compact. Also, since surface of the ceramic granule according to the present invention is made into compact and the ceramic granule has high strength, the ceramic granule exhibits an excellent anti-collapse property at the time of storage or transportation or during the course of packing into a mold. Also, since the ceramic granule of the present invention contains a specific amount of water in the interior thereof, the ceramic granule can maintain very good rigidity and can possess a good crushing property at a low temperature. Also, the ceramic granule of the present invention has outstanding effects that only a very small amount of fine particles are stuck to a mold at the time of dry molding, and the ceramic granule has a good mold releasing property. Furthermore, the granule of the present invention is characterized in that the internal portion and the surface of the granule have specific water distribution and, thus, the ceramic granule of the present invention is not restricted to the process of the granulation. Specifically, the process of the present invention may be applicable to the ceramic granule granulated by spray drying and ceramic granule granulated by oscillating extruding, which are distinguished from the prior art techniques.

Molding into Ceramic Product

The ceramic granules according to the present invention can be dry molded under a pressure in a mold according to the conventional process to produce a ceramic product having a high dimensional accuracy. Similar to the conventional process, the press pressure at this time is generally from 0.5 to 5 ton/cm$^2$, 1 to 4 ton/cm$^2$. The sintering temperature which depends upon the types of the granules, is generally from 800 to 1500° C., preferably from 900 to 1300° C.

In the case where the ceramic product is continuously produced utilizing the conventional ceramic granules in a conventional manner, when the molding is carried out several ten thousand to several million times, it can early be observed that the ceramic particles are stuck to the mold, and there is a large distribution in the size. In contrast, in the case where the ceramic product is continuously produced utilizing the ceramic granule according to the present invention, no adhering of the ceramic particles to the mold can be seen over several ten thousands molding. Also, due to a good flowability, a good mold packing property and a low unevenness in dimension, ceramic products having low unevenness and very high dimensional accuracy can be continuously produced over several thousands moldings.

EXAMPLES

The present invention will now be described by referring to Examples and Comparative Examples. However, it should be noted that the present invention is not restricted to Examples.

Example 1

In a wet pulverizer, 66 parts by weight of Ni—Cu—Zn ferrite powder as a ceramic particle, 34 parts by weight of water, 1 part by weight of polyvinyl alcohol as a binder and 0.25 part by weight of ammonium polycarboxylate as a dispersant were mixed to prepare a ferrite slurry. The resulting slurry was spray dried by the use of a spray drier to obtain a spherical ceramic granule having an average particle size of 125 $\mu$m.

Into a treating device D having an agitation fluidized bed as shown in FIG. 1, 20 kg of the resulting ceramic granule was incorporated. While maintaining the pressure of the interior of the bed at −400 mmAq and heating the bed, the bed was agitation-fluidized at a revolution number of rotator of 1240 rpm, air classification of the ceramic granule was carried out over a period of 2 minutes by means of mesh cloth (400#, opening 38 $\mu$m) placed on the upper side of the device, while blowing air into the bed at a primary air amount of 55 liter/minute. The temperature of the ceramic granule after the completion of the air classification was 30.5° C. and the temperature of the discharged air was 29.3° C.

Subsequently, the agitation-fluidization was continued, and water was sprayed to the ceramic granule in a total amount of 960 cc through a two-fluid nozzle at a flow amount of 60 cc/minute over a period of 16.0 minutes.

Subsequently, the agitation-fluidization was further continued, while blowing air at an intake temperature of 67.0° C. and the blow amount of 2.0 m$^3$/minute to dry the ceramic granule over a period of 2 minutes. After the drying was completed, the ceramic granule was discharged from the device to produce a compact ceramic granule according to the present invention in which the water content of the surface of the ceramic granule was smaller than that of the interior of the ceramic granule.

The particle size of the ceramic granule produced as described above was regulated by a shifter to produce a ceramic granule having a granularity distribution from 90 to 180 $\mu$m.

The properties of the resulting ceramic granule are shown in Table 1. Also, the surface conditions of the resulting ceramic granule are shown in FIG. 4A and FIG. 4B. FIG. 4A is the SEM photograph showing the surface conditions of one ceramic granule of the resulting ceramic granule, and FIG. 4B is the SEM photograph showing the granularity of FIG. 4A.

In Table 1, the bulk density was measured according to JIS K 5101, the flowability was measured as a time (second) required for perfectly dropping 50 g of the ceramic granule from the dropping funnel. As for the water content, the total water content of the ceramic granule, the water content of the ceramic granule which occupies ¼ of the total granule (surface) and the water content of the ceramic granule (interior) which occupies ¾ of the total granule were measured.

Subsequently, the ceramic granule was used to continuously produce two thousand ceramic products (cylindrical core: external diameter 1.5 mm, length 1.8) in a mold. When the appearance of adhering the ferrite material to the mold after the continuous molding was visibly observed, and judged as the following three-point scale:

○: no adhering of the material to the mold was observed even after the 200,000 moldings.

Δ: adhering of the material to the mold was observed after 10,000 moldings.

X: adhering of the material to the mold was observed after 10,000 moldings, and the continuous molding could not be carried out.

The results are shown in Table 2. Further, the size in the direction of the external diameter and the size in the lengthwise direction were measured, to obtain the maximum size (Max), minimum size (Min), and standard deviation (3σ). The results are also shown in Table 2.

Comparative Example 1

Comparative ceramic granule was produced in the same manner as in Example 1, except that the treatment in the agitation fluidized bed was not carried out.

Subsequently, ceramic products were continuously produced in the mold as in Example 1. However, ferrite was stuck to the mold at the time of 10,000 molding, causing defective appearance. For this reason, the molding thereafter could not be carried out.

The properties of the ceramic granule and those of the resulting ceramic product were measured as in Example 1. The results are shown in Tables 1 and 2 and FIG. 2. The surface conditions of ceramic granule are shown in FIG. 4. FIG. 4C is the SEN photograph showing the surf ace conditions of one ceramic granule of the resultant granules, FIG. 4D is the SEM photograph showing the granularity distribution of FIG. 4C.

TABLE 1

Characteristics of Granule

|  |  | Example 1 | Comparative Example 1 |
|---|---|---|---|
| Shape |  | Sphere | Sphere |
| Bulk density (g/cm$^3$) |  | 1.4 | 1.2 |
| Flowability (sec/50 g) |  | 20 | 25 |
| Water content (wt %) | Total | 1.2 | 0.5 |
|  | Surface | 0.2 | 0.3 |
|  | Interior | 1.5 | 0.7 |
| Average Particle size ($\mu$m) |  | 125 | 125 |

TABLE 2

Properties of Ceramic Product

|  |  | Example 1 | Comparative Example 1 |
|---|---|---|---|
| Anti-sticking property |  | ○ | x |
| External diameter | Max-Min | 6 $\mu$m | 8 $\mu$m |
|  | 3σ | 5 $\mu$m | 8 $\mu$m |
| Length | Max-Min | 11 $\mu$m | 20 $\mu$m |
|  | 3σ | 10 $\mu$m | 18 $\mu$m |

The followings have been understood from these results.

It has been proven that the ceramic granule obtained from the process of Example 1 could be continuously molded into 200, 000 or more ceramic products, showing very good anti-sticking property, while in the case of the ceramic granule obtained from Comparative Example 1, the ceramic particles were adhered onto the mold at the time of about 10,000 moldings, and the defective appearance was brought about. Consequently, it has been proven that the treatment according to the present invention could give the ceramic granule a very good anti-sticking property.

Furthermore, as shown in FIGS. 4A through 4D, it has been proven that in the case of the ceramic granule of Example 1, little or no fine particle was adhered to the surface and the granularity of the granulate was found to be uniform in comparison with the case of the ceramic granule obtained from Comparative Example 2.

Table 2 shows that as for the distribution (Max-Min) of the external direction and that of the lengthwise direction, the ceramic product from Example 1 was found to have little deviations which were 6 $\mu$m and 11 $\mu$m, respectively, whereas that from Comparative Example 1 was found to have wide deviations which were 8 $\mu$m and 20 $\mu$m, respectively. Also, with regard to the values of 3$\sigma$, in the case of Example 1, they were 5 $\mu$m and 10 $\mu$m, respectively showing very good size distribution in comparison with those of Comparative Example 1 which were 8 $\mu$m and 18 $\mu$m, respectively.

Figure 2:
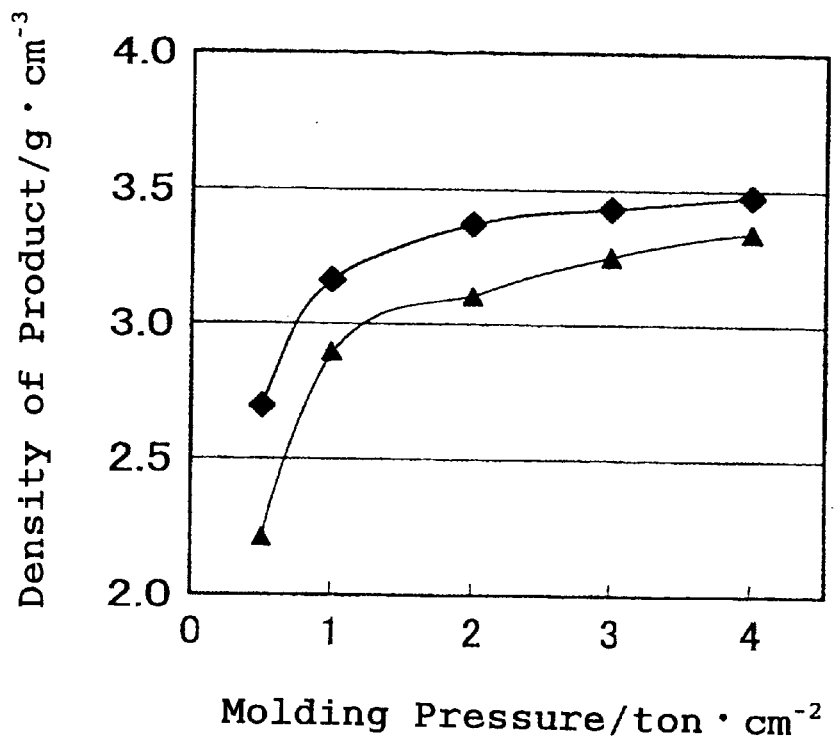
FIG. 2 is a graph showing the relations between the molding pressure of the inventive ceramic granule and comparative granulated by a spray-drying process and the density of the resulting ceramic product.
Figure 3:
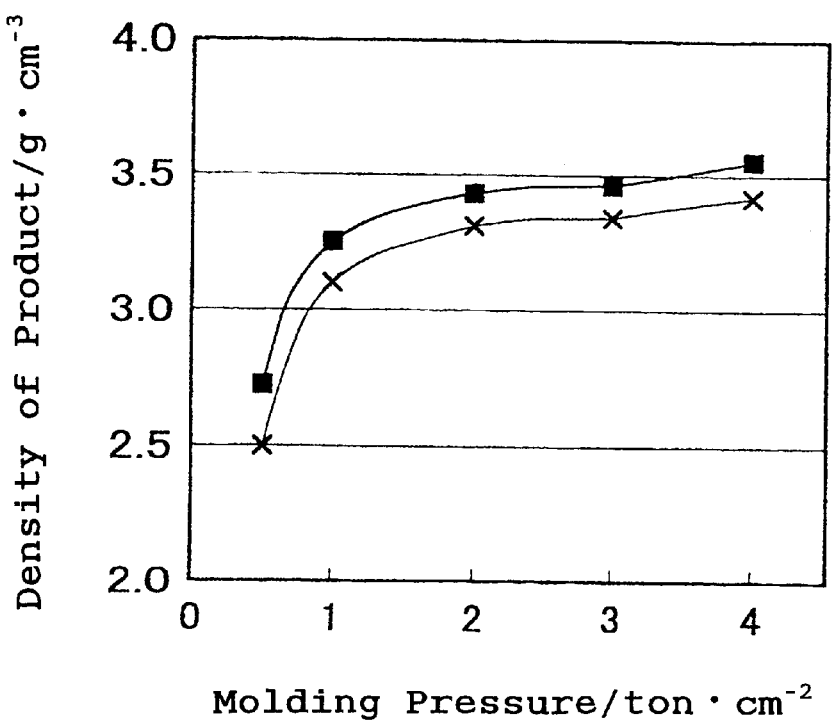
FIG. 3 is a graph showing the relations between the molding pressure of the inventive ceramic granule and comparative granulated by an oscillating-extruding process and the density of the resulting ceramic product.

Furthermore, as is clear from FIG. 2, in Example 1, a high product density can be obtained at the initial pressure of 0.5 ton/cm$^2$, there is little change in product density even by the change of the molding pressure from 0.5 to 4.0 ton/cm$^2$, showing a good molding ability.

Granulation by Oscillating Extruding

Example 2

In a stirring type granulator (TM mixer produced from Mitsui Mining Corporation), 17 parts by weight of aqueous polyvinyl alcohol solution having a solid concentration of 6% by weight was added to 100 parts by weight of Ni—Cu—Zn ferrite particle and, the mixture was stirred and granulated to produce granulated powder. The resultant granulated powder was dried over a belt type dryer, and extruded into granules by means of an oscillating extruding pulverizer (SINGLE GRANULATOR produced from Nippon Seiki Co., Ltd). Thereafter, the particle size of the granule was regulated by a shifter to obtain an oscillating extruded granule having an average particle size of 200 $\mu$m.

Into a treating device D having an agitation fluidized bed as shown in FIG. 1, 20 kg of the resulting ceramic granule was incorporated. While maintaining the pressure of the interior of the bed at −400 mmAq and heating the bed, the bed was agitation-fluidized at a revolution number of rotator of 240 rpm, air classification of the ceramic granule was carried out over a period of 2 minutes and 30 seconds by means of mesh cloth (400#, opening 38 $\mu$m) placed on the upper side of the device, while blowing air into the bed at a primary air amount of 55 liter/minute. The temperature of the ceramic granule after the completion of the air classification was 30.0° C. and the temperature of the discharged air was 29.2° C.

Subsequently, the agitation-fluidization was continued, and total amount of 1,200 cc of water was sprayed to the ceramic granule through a two-fluid nozzle at a flow amount of 60 cc/minute over a period of 20.0 minutes.

Subsequently, the agitation-fluidization was further continued, while blowing air at an intake temperature of 67.0° C. and the blow amount of 2.0 m$^3$/minute to dry the ceramic granule over a period of 1 minute and 30 seconds. After the drying was completed, the ceramic granule was discharged from the device to produce a compact ceramic granule according to the present invention in which the water content of the surface of the ceramic granule was smaller than that of the interior of the ceramic granule.

The properties of the ceramic granule were measured as in Example 1. The results are shown in Table 3. Also, cylindrical cores are continuously produced as in Example 1 utilizing this ceramic granule. The results are shown in Table 4.

Comparative Example 2

In a stirring type granulator (TM mixer produced from Mitsui Mining Corporation), 17 parts by weight of aqueous polyvinyl alcohol solution having a solid concentration of 6% by weight was added to 100 parts by weight of Ni—Cu—Zn ferrite particle and, the mixture was stirred and granulated to produce granulated powder. The resultant granulated powder was dried over a belt type dryer, and extruded into granules by means of an oscillating extruding pulverizer (SINGLE GRANULATOR produced from Nippon Seiki Co., Ltd). Thereafter, the particle size of the granule was regulated by a shifter to obtain an oscillating extruded granule having an average particle size of 200 $\mu$m.

The properties of the ceramic granule were measured as in Example 1. The results are shown in Table 3. Also, cylindrical cores are continuously produced as in Example 1 utilizing this ceramic granule. The results are shown in Table 4.

TABLE 3

Characteristics of Granule

| | | Example 2 | Comparative Example 2 |
|---|---|---|---|
| Shape | | Amorphous | Amorphous |
| Bulk density (g/cm$^3$) | | 1.5 | 1.5 |
| Flowability (sec/50 g) | | 28 | 30 |
| Water content (wt %) | Total | 2.8 | 2.8 |
| | Surface | 1.0 | 1.8 |
| | Interior | 3.7 | 3.3 |
| Average particle size $\mu$m | | 200 | 200 |

TABLE 4

Properties of Ceramic Product

| | | Example 2 | Comparative Example 2 |
|---|---|---|---|
| Anti-sticking property | | ◯ | △ |
| External diameter | Max-Min | 8 $\mu$m | 10 $\mu$m |
| | 3$\sigma$ | 8 $\mu$m | 10 $\mu$m |
| Length | Max-Min | 31 $\mu$m | 46 $\mu$m |
| | 3$\sigma$ | 30 $\mu$m | 40 $\mu$m |

Note) Population was 200,000.

From these results it has been understood that similar to that of Example 1, the ceramic granule of Example 2 could be continuously molded into 200,000 or more products without sticking any ceramic material to the mold, and showed very good anti-sticking property. In contrast, in the case of the ceramic granule obtained from Comparative Example 2, sticking of the ceramic material to the mold was observed at the time of 100,000 moldings. Consequently, it has been proven from Example 2 and Comparative Example 2 that an anti-sticking property could be improved even in the case of oscillating extruding process.

Moreover, when the conditions of the ceramic granules were observed similar to Example 1 and Comparative Example 1, the ceramic granule of Example 2 was found to have little fine particle adhered onto the surface thereof in comparison with the ceramic granule of Comparative Example 2, and the granularity thereof was found to be uniform in comparison with that of Comparative Example 2.

Table 4 shows that as for the distribution (Max-Min) of the external direction and that of the lengthwise direction, the ceramic product from Example 2 was found to have little deviations which were 8 μm and 31 μm, respectively, whereas that from Comparative Example 2 was found to have wide deviations which were 10 μm and 46 μm, respectively. Also, with regard to the values of 3σ, in the case of Example 2, they were 8 μm and 30 μm, respectively showing very good size distribution in comparison with those of Comparative Example 2 which were 10 μm and 40 μm, respectively.

As described above, the present invention has the following outstanding effects:

Since the ceramic granule of the present invention whose surface is dried is rich in the flowability and has high strength, it exhibits a good anti-collapse property at the time of the storage or transportation. Also, since the ceramic granule of the present invention contains a prescribed amount of water in the interior of the granule, it can maintain the very good rigidity, exhibits a good crushing property at a low pressure, and exhibits the effect that the very little material is stuck to the mold in the course of the dry molding.

Furthermore, the ceramic granule of the present invention is characterized in that the internal portion and the surface of the granule have specific water distribution and, thus, the ceramic granule of the present invention is not restricted to the process of the granulation. Specifically, the process of the present invention may be applicable to the ceramic granule granulated by a spray drying process and a ceramic granule granulated by oscillating extruding, which is distinguished from the prior art techniques.

To be specific, the ceramic granule obtained from the spray drying process has a compact surface, has sufficient strength, and has a large bulk density in comparison with that produced by the conventional process.

The ceramic granule of the present invention can be produced or treated by agitation-fluidizing a granulated ceramic granule in an agitation-fluidized bed, preferably after the removal of fine particle by air classification, spraying an aqueous medium to the ceramic granule, and then fluidizing and drying the ceramic granule.

When the ceramic granule of the present invention is used to produce a ceramic product, since sticking of the ceramic granules onto the mold cannot be observed over a prolong period of time, and since the ceramic granule has a good flowability and a good packing property of the ceramic granule into the mold and, thus the deviation in the amount of the ceramic granule packed into the mold becomes minimized, ceramic products having little deviation in size, i.e., high dimensional accuracy can be molded several hundred thousand times or more.

What is claimed is:

1. A ceramic granule for producing a ceramic product comprising at least one ceramic particle and a binder, the total water content of the ceramic granule ranging from 0.1 to 6.0% by weight, the internal water content of the ceramic granule which occupies ¾ of the total granule ranging from 0.1 to 7.3% by weight, and the external water content of the ceramic granule which occupies ¼ of the total granule ranging from 0 to 2.0% by weight.

2. A process for treating a ceramic granule, which comprises the following steps:
   a step for granulating one or more ceramic particles into a granule together with a binder;
   a step for moistening the granulated ceramic granule in an agitation fluidized bed under the conditions of not aggregating said ceramic granule;
   a step for regulating the water content of the moistened ceramic granule by fluidizing and drying the moistened ceramic granule in the agitation fluidized bed in such a manner that the resultant granule has an internal water content which occupies ¾ of the total granule ranging from 0.1 to 7.3% by weight, and an external water content which occupies ¼ of the total granule ranging from 0–2.0% by weight; and
   a step for regulating the particle size of the ceramic granule.

3. The process as claimed in claim 2, which further comprises: a step for carrying out classifying in the agitation fluidized bed by means of a bag filter or air-classification to remove fine particles having a particle size of not more than 10 μm, after the step for granulating one or more ceramic particle into a granule together with a binder.

4. A process for treating a ceramic granule, which comprises the following steps:
   a step for incorporating a ceramic granule obtained by granulating one or more ceramic particles into a granule together with a binder in an agitation fluidized bed, and moistening the granulated ceramic granule under the conditions of not aggregating said ceramic granule;
   a step for regulating the water content of the moistened ceramic granule by fluidizing and drying the moistened ceramic granule in the agitation fluidized bed in such a manner that the resultant granule has an internal water content which occupies ¾ of the total granule ranging from 0.1 to 7.3% by weight, and an external water content which occupies ¼ of the total granule ranging from 0–2.0% by weight; and
   a step for classifying the moistened ceramic granule.

5. The process as claimed in claim 4, which further comprises: a step for carrying out classifying in the agitation fluidized bed by means of a bag filter or air-classification to remove fine particles having a particle size of not more than 10 μm, after the step for granulating one or more ceramic particle into a granule together with a binder.

6. A ceramic product having a high accuracy obtained by molding the ceramic granule as claimed in claim 2 into a ceramic product.

7. A process producing a ceramic product, which comprises the following steps:
   a step for incorporating a ceramic granule obtained by granulating one or more ceramic particles into a granule together with a binder in an agitation fluidized bed, and moistening the granulated ceramic granule under the conditions of not aggregating said ceramic granule;
   a step for regulating the water content of the moistened ceramic granule by fluidizing and drying the moistened ceramic granule in the agitation fluidized bed in such a manner that the resultant granule has an internal water content which occupies ¾ of the total granule ranging from 0.1 to 7.3% by weight, and an external water content which occupies ¼ of the total granule ranging from 0–2.0% by weight; and
   a step for regulating the particle size of the ceramic granule; and a step for molding the resulting ceramic granule into a ceramic product.

8. The process as claimed in claim 7, which further comprises: a step for carrying out classifying in the agitation fluidized bed by means of a bag filter or air-classification to remove fine particles having a particle size of not more than 10 $\mu$m, after the step for granulating one or more ceramic particle into a granule together with a binder.

* * * * *